United States Patent
Chen et al.

(10) Patent No.: US 10,243,799 B2
(45) Date of Patent: Mar. 26, 2019

(54) METHOD, APPARATUS AND SYSTEM FOR VIRTUALIZING A POLICY AND CHARGING RULES FUNCTION

(71) Applicant: Huawei Technologies Co., Ltd., Shenzhen (CN)

(72) Inventors: Yuhua Chen, Shenzhen (CN); Chenghui Peng, Shenzhen (CN); Wei Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 339 days.

(21) Appl. No.: 15/152,328

(22) Filed: May 11, 2016

(65) Prior Publication Data
US 2016/0254958 A1 Sep. 1, 2016

Related U.S. Application Data

(63) Continuation of application No. PCT/CN2013/086914, filed on Nov. 12, 2013.

(51) Int. Cl.
*H04L 12/24* (2006.01)
*G06F 9/455* (2018.01)

(52) U.S. Cl.
CPC ...... *H04L 41/0893* (2013.01); *G06F 9/45558* (2013.01); *H04L 41/5096* (2013.01); *G06F 2009/45579* (2013.01)

(58) Field of Classification Search
CPC .................................................. H04L 41/0893
See application file for complete search history.

(56) References Cited

U.S. PATENT DOCUMENTS

| | | | |
|---|---|---|---|
| 2009/0024502 A1 | 1/2009 | Xie et al. | |
| 2010/0017861 A1 | 1/2010 | Krishnaswamy et al. | |
| 2013/0121207 A1 | 5/2013 | Parker et al. | |
| 2015/0071125 A1* | 3/2015 | Wang | H04L 12/1407 370/259 |
| 2015/0124622 A1* | 5/2015 | Kovvali | H04W 28/0215 370/236 |

FOREIGN PATENT DOCUMENTS

| | | |
|---|---|---|
| CN | 101136758 A | 3/2008 |
| CN | 102100112 A | 6/2011 |
| CN | 103108416 A | 5/2013 |
| WO | WO 2012160465 A1 | 11/2012 |

OTHER PUBLICATIONS

"PCRF in the Cloud," LightReading; Networking the Communications Industry, http://www.lightreading.com/document.asp?doc_id=693294, Feb. 5, 2012.*

* cited by examiner

*Primary Examiner* — Suraj M Joshi
(74) *Attorney, Agent, or Firm* — Leydig, Voit & Mayer, Ltd.

(57) ABSTRACT

A policy and charging rules function (PCRF) virtualization method, device and a virtualization policy and charging system are provided. The device includes: at least two virtual machine; where each of the virtual machine correspondingly realizes at least one function of the PCRF device; and the virtual machines are connected to each other through an Internet Protocol (IP) rout. According to the technical solution of the embodiments of the present disclosure, when a function of a PCRF VM is expanded, the VM can be configured flexibly, thereby reducing the cost and improving the performance price ratio.

8 Claims, 4 Drawing Sheets

METHOD, APPARATUS AND SYSTEM FOR VIRTUALIZING A POLICY AND CHARGING RULES FUNCTION

CROSS-REFERENCE TO RELATED APPLICATIONS

This application is a continuation of International Patent Application No. PCT/CN2013/086914, filed on Nov. 12, 2013, which is hereby incorporated by reference in its entirety.

FIELD OF TECHNOLOGY

The embodiments of the present application relate to the field of communication, particularly to a policy and charging rules function virtualization method, apparatus and system.

BACKGROUND

With the development of Virtual Machine (VM) technology, functions of conventional network devices may be implemented through VMs.

FIG. 1 is a diagram illustrating a process for virtualizing a policy and charging rules function (PCRF) entity in conventional technology. As shown in FIG. 1, functions of the PCRF entity are entirely virtualized in the conventional technology, to form a PCRF VM. Further, in a case that there are multiple PCRF VMs, a virtualization switch (SWITCH) may be responsible for routing among the multiple PCRF VMs.

However, it is difficult to flexibly configure a VM when extending performances of a PCRF VM in the conventional technology, thereby the cost is high and the cost effectiveness is low.

SUMMARY

A policy and charging rules function virtualization method, device and a virtualization policy and charging system are provided according to the embodiments of the disclosure, to avoid an issue in the conventional technology that a VM cannot be configured flexibly when a performance of a PCRF VM is extended, the cost is high and the cost effectiveness is low.

In a first aspect, a virtualization policy and charging rules function PCRF device is provided according to the embodiments of the disclosure, which includes:
at least two virtual machines; where
each of the virtual machines correspondingly realizes at least one function of the PCRF device; and
the virtual machines are connected to each other through an internet protocol IP route.

Combining with the first aspect, in a first possible implementation of the first aspect, the PCRF device specifically includes a control plane virtual machine and a user plane virtual machine; where
the control plane virtual machine is configured to implement a control plane function of the PCRF device, and the user plane virtual machine is configured to implement a user plane function of the PCRF device.

Combining with the first aspect, in a second possible implementation of the first aspect, the PCRF device specifically includes a control plane virtual machine and a user plane virtual machine; where
the control plane virtual machine is configured to implement a control plane function of the PCRF device; and the user plane virtual machine includes one or more I/O virtual machines configured to implement an Input/Output I/O function, and one or more search virtual machines configured to implement a search function.

Combining with the second possible implementation of the first aspect, in a third possible implementation of the first aspect, the user plane virtual machine further includes one or more storage virtual machines configured to implement a storage function.

In a second aspect, a virtualization policy and charging system is provided, which includes:
a mediation device and at least two virtualization policy and charging rules function PCRF devices according to any one of the first to the third possible implementations of the first aspect, where the at least two PCRF devices are connected to the mediation device through a virtualization switch; and
the mediation device is configured to perform routing among the at least two PCRF devices through the virtualization switch, and increase or decrease the user plane virtual machine of the PCRF device based on resource request information sent by the PCRF device.

Combining with the second aspect, in a first possible implementation of the second aspect, the mediation device is specifically configured to perform at least one of the following operations:
adding at least one I/O virtual machine to the PCRF device or removing at least one I/O virtual machine from the PCRF device based on the resource request information;
adding at least one search virtual machine to the PCRF device or removing at least one search virtual machine from the PCRF device based on the resource request information; or
adding at least one storage virtual machine to the PCRF device or removing at least one storage virtual machine from the PCRF device based on the resource request information.

In a third aspect, a policy and charging rules function PCRF virtualization method is provided, which includes:
dividing functions of a PCRF device to obtain at least two functions; and
performing virtualization processing on the at least two functions to obtain virtual machines respectively corresponding to the at least two functions, where the virtual machines are connected to each other through an internet protocol IP route.

Combining with the third aspect, in a first possible implementation of the third aspect, the dividing the functions of the PCRF device to obtain at least two functions includes:
dividing the functions of the PCRF device to obtain a control plane function and a user plane function of the PCRF device;
the performing virtualization processing on the at least two functions to obtain virtual machines respectively corresponding to the at least two functions includes:
performing the virtualization processing on the control plane function and user plane function, to obtain a control plane virtual machine corresponding to the control plane function, and a user plane virtual machine corresponding to the user plane function.

Combining with the third aspect, in a second possible implementation of the third aspect, the dividing the functions of the PCRF device to obtain at least two functions includes:
dividing the functions of the PCRF device to obtain a control plane function and a user plane function of the PCRF device, where the user plane function includes an input and output I/O function and a search function;

the performing virtualization processing on the at least two functions to obtain virtual machines respectively corresponding to the at least two functions includes:

performing the virtualization processing on the control plane function and user plane function, to obtain a control user virtual machine corresponding to the control plane function, and a user plane virtual machine corresponding to the user plane function, where the user plane virtual machine includes an I/O virtual machine corresponding to the I/O function and a search virtual machine corresponding to the search function.

Combining with the second possible implementation of the third aspect, in a third possible implementation of the third aspect, the user plane function further includes a storage function, and the user plane virtual machine further includes a storage virtual machine corresponding to the storage function.

Combining with any one of the first to the third possible implementations of the third aspect, in a fourth possible implementation of the third aspect, the control plane function includes a session binding sub-function, a policy and charging control PCC decision sub-function, and an emergency service authorization sub-function.

In a fourth aspect, a policy and charging rules function PCRF virtualization apparatus is provided, which includes:

a division module, configured to divide functions of a PCRF device to obtain at least two functions; and a virtualization module, configured to perform virtualization processing on the at least two functions, to obtain virtual machines respectively corresponding to the at least two functions, where the virtual machines are connected to each other through an internet protocol IP route.

Combining with the fourth aspect, in a first possible implementation of the fourth aspect, the division module is specifically configured to divide the functions of the PCRF device to obtain a control plane function and a user plane function of the PCRF device; and the virtualization module is specifically configured to perform the virtualization processing on the control plane function and user plane function, to obtain a control plane virtual machine corresponding to the control plane function, and a user plane virtual machine corresponding to the user plane function.

Combining with the fourth aspect, in a second possible implementation of the fourth aspect, the division module is specifically configured to divide the functions of the PCRF device to obtain a control plane function and a user plane function of the PCRF device, where the user plane function includes an input and output I/O function and a search function; and the virtualization module is specifically configured to perform the virtualization processing on the control plane function and user plane function, to obtain a control plane virtual machine corresponding to the control plane function, and a user plane virtual machine corresponding to the user plane function, where the user plane virtual machine includes an I/O virtual machine corresponding to the I/O function and a search virtual machine corresponding to the search function.

Combining with the second possible implementation of fourth aspect, in a third possible implementation of the fourth aspect, the user plane function further includes a storage function, and the user plane virtual machine further includes a storage virtual machine corresponding to the storage function.

Combining with any one of the first to the third possible implementations of the fourth aspect, in a fourth possible implementation of the fourth aspect, the control plane function includes a session binding sub-function, a policy and charging control PCC decision sub-function, and an emergency service authorization sub-function.

According to the policy and charging rules function virtualization method, apparatus and system provided by the embodiments of the disclosure, functions of a PCRF device are divided and virtualization processing are performed on the divided functions, the realize that each virtual machine corresponds to at least one function of the PCRF device, thereby avoiding an issue in the conventional technology that a VM cannot be configured flexibly when a performance of a PCRF VM is extended, the cost is high and the cost effectiveness is low.

BRIEF DESCRIPTION OF THE DRAWINGS

In order to illustrate the technical solution according to embodiments of the invention or in the conventional technology more clearly, the drawings to be used in the description of the embodiments or the conventional technology are described briefly hereinafter. Apparently, the drawings in the description hereinafter are some embodiments of the invention, and other drawings may be obtained by those skilled in the art according to those drawings without creative effort.

DETAILED DESCRIPTION OF THE EMBODIMENTS

To make the objective, technical solution and merits of the embodiments of the disclosure more clear, the technical solution according to the embodiments of the disclosure will be described clearly and completely in conjunction with the drawings hereinafter. Apparently, the described embodiments are just a few rather than all of the embodiments of the disclosure. All other embodiments obtained by those skilled in the art based on the embodiments of the disclosure without any creative work will fall within the protection scope of the disclosure.

In the embodiments of the disclosure, a virtualization policy and charging rules function PCRF device includes at least two VMs, each VM correspondingly implements at least one function of the PCRF device. In other words, functions of the PCRF entity are divided into control, search, storage and the like, and each function is implemented virtually by one or more VMs. For example, the function of search may be implemented virtually by three VMs, and the three VMs take on the search task of the PCRF device cooperatively. Alternatively, each VM may implement one or more functions, e.g., one VM may implement an I/O function, and a storage function as well; That is, the VM is responsible for the task of receiving and transmitting of the PCRF device, and may store received important information locally for subsequent use. The VMs are connected to each other through an internet protocol (IP) route, to implement communications between the VMs.

Figure 1:
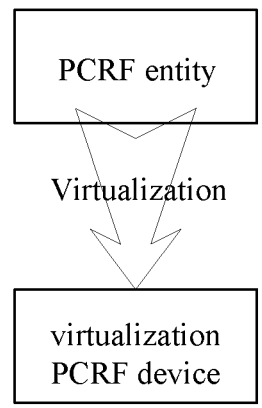
FIG. 1 is a diagram illustrating a process for virtualizing a PCRF entity in the conventional technology.
Figure 2:
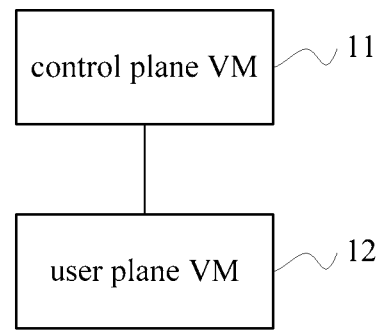
FIG. 2 is a structural diagram of a virtualization policy and charging rules function PCRF device according to a first embodiment of the present disclosure.

FIG. 2 is a structural diagram of a virtualization policy and charging rule function PCRF device according to a first embodiment. As shown in FIG. 2, the PCRF device according to the embodiment may include a control plane VM 11 and a user plane VM 12, where the control plane VM 11 is configured to implement a control plane function of the PCRF device, and the user plane VM 12 is configured to implement a user plane function of the PCRF device.

In the embodiment, the PCRF device is divided into the control plane and the user plane which are implemented by the corresponding VMs, thereby reflecting the feature of software defined network (SDN). In this way, in a case that a performance bottleneck occurs in a certain function and an extension for the function is required, the VM may be configured flexibly, and it is only required to assign a new VM to implement the function in which the performance bottleneck, thereby reducing the complexity of software of a virtualization PCRF device and making it easy to manage. Further, the function extension has a low cost and a high cost effectiveness.

Figure 3:
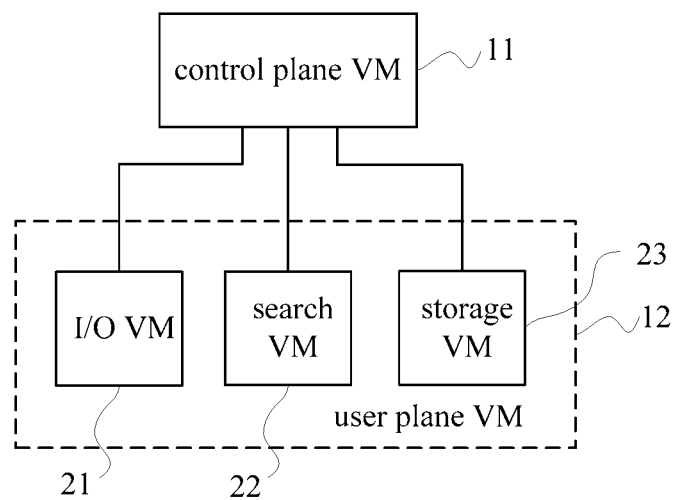
FIG. 3 is a structural diagram of a virtualization policy and charging rules function PCRF device according to a second embodiment of the present disclosure.

FIG. 3 is a structural diagram of a virtualization policy and charging rules function PCRF device according to a second embodiment. As shown in FIG. 3, the PCRF device according to this embodiment is based on the PCRF device shown in FIG. 2. Further, the user plane VM 12 may include an Input/Output (I/O) VM 21, a search VM 22 and a storage VM 23. Where the I/O VM 21 is configured to implement an I/O function, the search VM 22 is configured to implement a search function, and the storage VM 23 is configured to implement a storage function.

Further, the I/O VM 21, search VM 22, or storage VM 23 may be one or more VM, i.e., each of the functions may be implemented by one VM, or may be implemented by multiple VMs, which depends on loads of the VMs with the functions mentioned above, which is not limited herein.

Figure 4:
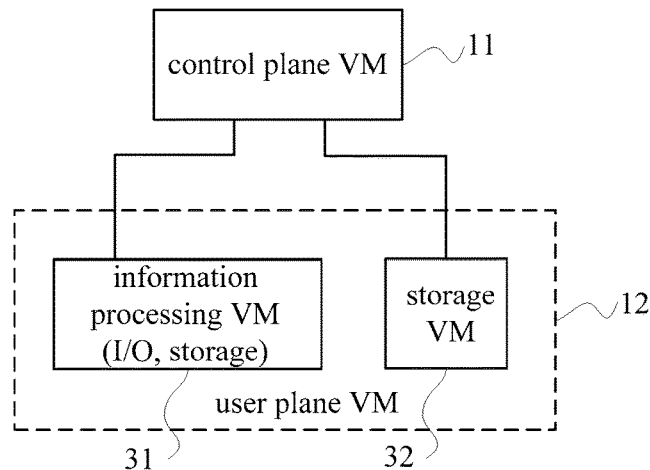
FIG. 4 is a structural diagram of a virtualization policy and charging rules function PCRF device according to a third embodiment of the present disclosure.

Optionally, FIG. 4 is a structural diagram of a virtualization policy and charging rules function PCRF device according to a third embodiment. As shown in FIG. 4, the PCRF device according to this embodiment is based on the PCRF device shown in FIG. 2. Further, the user plane VM 12 may include an information processing VM 31 and a search VM 32. Where the information processing VM 31 is configured to implement two functions of the user plane including the I/O function and the storage function; and the search VM 32 is configured to implement the search function. The information processing VM 31 or search VM 32 may be one or more VM, i.e., each of the functions may be implemented by one VM, or may be implemented by multiple VMs, which depends on loads of the VMs with the functions mentioned above, which is not limited herein.

In the embodiment, the functions of the user plane are further divided into the I/O function, search function, and storage function, and each of the functions is implemented by one or more VMs. In this way, the functions of the user plane are divided in a finer granularity. In a case that a performance bottleneck such as overload and slow operation occurs in a VM corresponding to a certain function, e.g., content required to be searched by the search VM exceeds a maximum load of the VM, a new search VM is assigned to take on the search function. The complexity of software implementation is low, and it is easy to manage.

Three processes to realize the PCRF device are described using examples, and the functions of the VMs of the PCRF device and interactions between the VMs are illustrated in detail.

A process of policy and charging control (Policy and Charging Control, hereinafter referred to as PCC) authorization for the PCRF device is as follows: the PCC authorization is a core function of the PCRF device, and for a network to which a PCC architecture is deployed, each bearer management operation may be performed only after the PCC authorization.

In step 1, an I/O VM of a PCRF device receives PCC authorization request information sent from a gateway device, where the PCC authorization request information carries bearer information, such as quality of service (QoS), traffic flow template (TFT) to identify a source address, a destination address, a source port, a destination port of the communication, and service description information. The I/O VM receiving the PCC authorization request information may be determined based on a preset rule, e.g., the I/O VM may be selected based on address information corresponding to a source device of the PCC authorization request information, specifically, based on an IP address of the source device of the PCC authorization request information, which is not limited herein.

In step 2, the I/O VM forwards the received PCC authorization request information to a corresponding search VM, based on a forwarding rule which is stored in the I/O VM in advance by a control plane VM of the PCRF device.

In step 3, the search VM searches, based on the PCC authorization request information, for subscription index information corresponding to the PCC authorization request information in information stored locally, obtains, based on the index information, corresponding user subscription index information from a storage VM, and sends the user subscription information and the PCC authorization request information to the control plane VM.

In step 4, the control plane VM performs bearer binding, based on the PCC authorization request information and the user subscription information, on the PCC authorization request information and a IP-connectivity access network (IP-CAN) corresponding to the PCC authorization request information, and generates bearer mapping information.

In step 5, the control plane VM draws a policy for the policy and charging control, based on a bearer binding result, the PCC authorization request information and the user subscription information, generates PCC authorization information, and sends the PCC authorization information to the I/O VM.

In step 6, the I/O VM sends the PCC authorization information to the gateway device.

Further, in step 3, if the search VM fails to search, based on the PCC authorization request information, for the user subscription index information corresponding to the PCC authorization request information in the information stored locally, the search VM sends the PCC authorization request information to the control plane VM. Since the control plane VM fails to search for the user subscription information in information sent from the search VM, the control plane VM sends a user subscription information request to a user subscription information database based on the PCC authorization request information, generates PCC authorization information based on user subscription information obtained from the user subscription information database and the PCC authorization request information, sends the PCC authorization information to the I/O VM and sends the user subscription information to the storage VM to store for subsequent use.

A process of emergency service authorization for the PCRF device is as follows: the emergency service is a communication service provided to users in emergency cases, such as an alarm, a medical emergency, and disaster relief. In case of an emergency service, the PCRF device is required give priority to the emergency service to be handled.

In step 1, an I/O VM of the PCRF device receives PCC authorization request information sent from a gateway device.

In step 2, the I/O VM forwards the received PCC authorization request information to a corresponding search VM, based on a forwarding rule stored in the I/O VM in advance.

In step 3, the search VM is notified, based on information stored locally, that the authorization request is an authorization request for an emergency service, i.e., the PCC authorization request information includes identity information of the emergency service, and the search VM sends the PCC authorization request information and the identity information of the emergency service to a control plane VM.

In step 4, the control plane VM obtains, based on the PCC authorization request information and the identity information of the emergency service, information of the emergency service corresponding to the identity information of the emergency service from a storage VM, generates authorization information of the emergency service based on the PCC authorization request information and the information of the emergency service, and sends the authorization information of the emergency service to the I/O VM.

In step 5, the I/O VM sends the authorization information of the emergency service to the gateway device.

Further, in step 4, if the control plane VM fails to obtain the information of the emergency service corresponding to the identity information of the emergency service from the storage VM, the control plane VM sends an emergency service information request to a user subscription information database, generates the authorization information of the emergency service based on the information of the emergency service obtained from the user subscription information database and the PCC authorization request information, sends the authorization information of the emergency service to the I/O VM, and sends the information of the emergency service to the storage VM to store for subsequent use.

A process of load balance for homogeneous VMs of the PCRF device is as follows: among the homogeneous VMs of the PCRF device, some VMs may be overload, while other VMs may be underload, thereby causing a load imbalance for the homogeneous VMs. The search VM is taken for example, to illustrate the process of load balance for the homogeneous VMs.

In step 1, a control plane VM of the PCRF device periodically collects resource usage for each search VM, e.g., the control plane VM may periodically collect usage information of a central processing unit (Central Processing Unit, hereinafter referred to as CPU).

In step 2, the control plane VM finds that a search VM is overload, i.e., the resource usage exceeds a preset threshold, for example, a CPU percent usage exceeds a reasonable threshold. Then part of PCC authorization request information is switched to an idle search VM for processing, to achieve the load balance among the search VMs.

Figure 5:
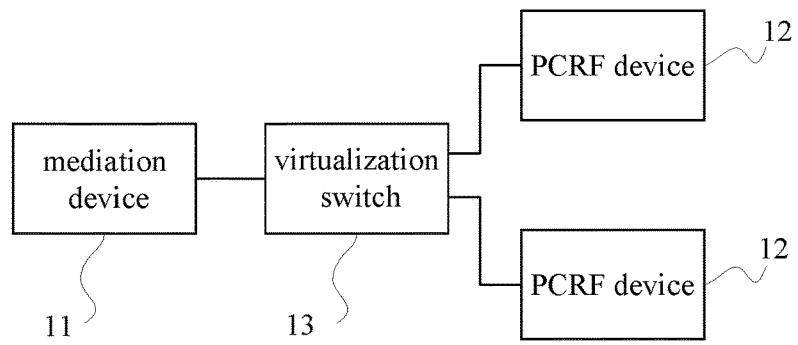
FIG. 5 is a structural diagram of a virtualization policy and charging system according the present disclosure.

FIG. 5 is a structural diagram of a virtualization policy and charging system according to the disclosure. As shown in FIG. 5, the system according to the embodiment includes a mediation device 11, at least two PCRF devices 12 and a virtualization switch 13. The mediation device 11 is configured to perform routing among the at least two PCRF devices 12 through the virtualization switch 13, and increase or decrease user plane VMs of each PCRF device 12 based on resource request information sent by the PCRF device 12. The structure in device embodiments shown in FIG. 2, FIG. 3 or FIG. 4 may be adopted for the PCRF device. The virtualization switch 13 is configured to connect the at least two PCRF devices 12 to the mediation device 11, and perform routing among the at least two PCRF devices 12.

In the embodiment, the mediation device 11 adjusts the user plane VM of the PCRF devices 12 based on the resource request information sent by the PCRF devices 12, i.e., the mediation device 11 increases or decreases the user plane VM of the PCRF devices 12, in order to achieve the load balance among the user plane VM of the PCRF devices 12, without influencing operation of the PCRF device due to performance degradation of a certain VM.

Further, the mediation device 11 may increase or decrease the user plane VMs of the PCRF device 12 based on the resource request information sent by the PCRF device 12 in the following way: the mediation device 11 adds at least one I/O VM to the PCRF device or removes at least one I/O VM from the PCRF device based on the resource request information; or, the mediation device 11 adds at least one search VM to the PCRF device 12 or removes at least one search VM from the PCRF devices 12 based on the resource request information; or, the mediation device 11 adds at least one storage VM to the PCRF device 12 or removes at least one storage VM from the PCRF devices 12 based on the resource request information. For example, the mediation device 11 finds, based on the resource request information, that the PCRF device 12 request for increasing a search VM, and the mediation device 11 assigns a reasonable amount of search VMs to the PCRF device 12 based on available resources, and sends an assignment result to the PCRF device 12, so that a control relation is established between the PCRF device 12 and the newly assigned search VM. And the PCRF device assigns authorization request information received subsequently to the newly assigned search VM, thereby effectively alleviating loading pressure for the search VMs of the PCRF device 12.

Figure 6:
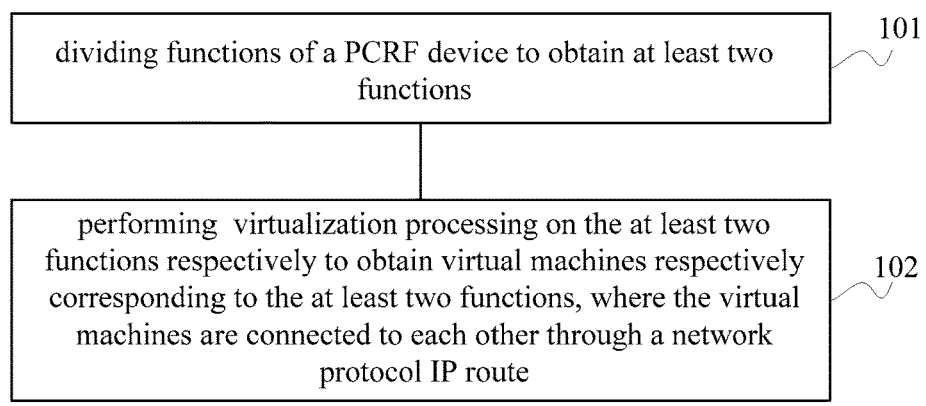
FIG. 6 is a flowchart of a policy and charging rules function PCRF virtualization method according to a first embodiment of the present disclosure.

FIG. 6 is a flowchart of a policy and charging rules function virtualization method according to the disclosure. As shown in FIG. 6, the method according to the embodiment may include steps 101 to 102.

In step 101, functions of a PCRF device are divided to obtain at least two functions.

In the embodiment, functions of the PCRF device are divided into at least two functions. The PCRF device is a policy decision point for the policy and charging control of a service data flow and an IP-borne resource, and selects and provides an available decision of policy and charging control for a policy and charging execution unit. Thus, there is inevitably more granular function division under a premise that the functions are implemented, in order to obtain the more granular functions.

In step 102, virtualization processing are performed on the at least two functions, to obtain virtual machines corresponding to the at least two functions respectively, and the virtual machines are connected to each other through an internet protocol IP route.

In the embodiment, virtualization processing are performed on the at least two divided functions, and each function corresponds to a virtual machine, the virtual machine is only required to implement a single corresponding function, and the virtual machines are connected to each other through an internet protocol IP route, to realize communication with each other.

In the embodiment, the functions of the PCRF device are divided and virtualization processing are performed on the divided functions, to realize that each virtual machine corresponds to a function of the PCRF device, thereby avoiding an issue that if a performance bottleneck occurs in a certain function and an extension of the certain function is required, the entire PCRF function needs to be run in a newly assigned VM, which causes low cost effectiveness and inflexibility.

Figure 7:
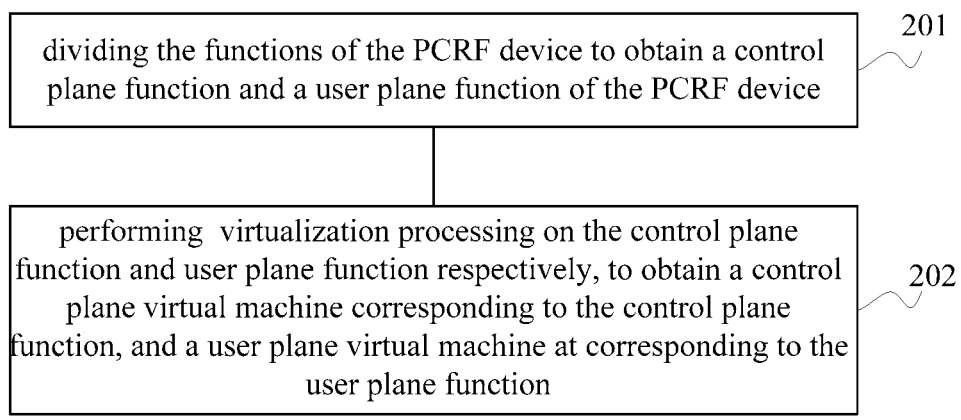
FIG. 7 is a flowchart of a policy and charging rules function PCRF virtualization method according to a second embodiment of the present disclosure.

FIG. 7 is a flowchart of a policy and charging rules function PCRF virtualization method according to the second embodiment. The method according to the embodiment may include steps 201 to 202.

In step 201, functions of a PCRF device are divided into control plane function and a user plane function.

In the embodiment, after the functions of the PCRF device are divided, the control plane function and the user plane function are obtained. The control plane function further includes a session binding sub-function, a policy and charging control PPC decision sub-function, and an emergency service authorization sub-function. A session binding unit is configured to bind, based on authorization request information and user subscription information, the authorization request information to an IP-CAN bearer corresponding to the authorization request information, and generate mapping information of the bearer. A decision unit is configured to make, based on the authorization request information and the user subscription information, a decision for a policy and charging control, generate authorization information for the policy and charging control, and send the authorization information for the policy and charging control to a user plane VM. An emergency authorization unit is configured to obtain, based on the authorization request information and an identify information of an emergency service, information of the emergency service corresponding to the identity information of the emergency service from the user plane VM, generate authorization information of the emergency service based on the authorization request information and the information of the emergency service, and send the authorization information of the emergency service to the user plane VM.

In step 202, virtualization processing are performed on the control plane function and the user plane function, to obtain a control plane virtual machine corresponding to the control plane function and a user plane virtual machine corresponding to the user plane function.

In the embodiment, the virtualization processing are performed on the control plane function and user plane function, the control plane function corresponds to the control plane virtual machine, and the user plane function corresponds to the user plane virtual machine.

Further, the user plane function is divided into an I/O function, a search function and a storage function. Accordingly, the user plane virtual machine includes an I/O VM corresponding to the I/O function, a search VM corresponding to the search function, and a storage VM corresponding to the storage function. Interactions among the virtual machines to realize the functions of the PCRF device are already described in three specific processes of the PCRF device mentioned above, which are not repeated herein.

In the embodiment, the functions of the PCRF device are divided in a finer granularity, and virtualization processing are performed on the divided functions, to realize that each virtual machine corresponds to a function of the PCRF device and to avoid an issue that if a performance bottleneck occurs in a certain function and an extension of the certain function is required, the entire PCRF function needs to be run in a newly assigned VM, which causes low cost effectiveness, high software complexity, and a difficulty to manage.

Figure 8:
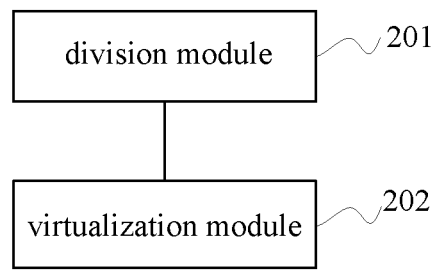
FIG. 8 is a structural diagram of a policy and charging rules function PCRF virtualization apparatus according to the embodiment.

FIG. 8 is a structural diagram of a policy and charging rules function PCRF virtualization apparatus according to the embodiment of the disclosure. As shown in FIG. 8, the apparatus according to the embodiment of the disclosure may include a division module 11 and a virtualization module 12. The division module 11 is configured to divide functions of the PCRF device to obtain at least two functions. The virtualization module 12 is configured to perform virtualization processing on the at least two functions, to obtain virtual machines respectively corresponding to the at least two functions, and the virtual machines are connected to each other through an internet protocol IP route.

The apparatus in the embodiment may be configured to execute technical solutions according to method embodiments shown in FIG. 6 or FIG. 7. Implementation principles and technical effects are similar, which are not repeated herein.

It should be understood that, according to the embodiments of the disclosure, the disclosed devices and methods may be implemented in other ways. For example, the described device embodiment is merely exemplary. The division of the units is merely based on logical functions, and the units may be divided with other approaches in practice. For example, multiple units or components may be combined, or may be integrated into another system, or some features may be omitted or not be implemented. In addition, the displayed or discussed couplings, direct couplings or communication connections may be implemented via indirect couplings or communication connections between some interfaces, devices or units, which may be electrical, mechanical or in other forms.

The units described as separate components may be or may not be separated physically. The components shown as units may be or may not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The foregoing integrated units may be realized in a form of hardware, or realized in a form of hardware and software functional units.

The integrated unit implemented in the form of software function unit may be stored in a computer readable storage medium. The software function unit is stored in a storage medium and includes several instructions for instructing a computer device (which may be a personal computer, a server, a network device or the like) or a processor to implement part of the steps of the methods according to the embodiments of the disclosure. The foregoing storage medium includes various media that can store programs, for example, USB disk, mobile hard disk drive, read-only memory (ROM), random access memory (RAM), magnetic disk, optical disk and the like.

Those skilled in the art should know clearly that, for convenience and concision of description, the function module division mentioned above is only taken as an example for illustration. In practical applications, the above functions may be implemented by different function modules as required, i.e., the internal structure of the device is divided into different function modules, in order to implement all of or part of the functions described above. A corresponding process according to the forgoing method embodiment may be referred to in order to know the operation process of the described device, which is not described again here.

Finally, it should be noted that, the above embodiments are only to illustrate the technical solution of the invention, not to limit the invention. Though the disclosure is described in detail according to the embodiments, those skilled in the art should understand that, the technical solution of the embodiments may be modified, or part of or all of the technical features may be equivalently substituted, and the modification and substitution do not make the essence of corresponding technical solution depart from the scope of the technical solution according to the embodiments of the disclosure.

What is claimed is:

1. A virtualization Policy and Charging Rules Function (PCRF) device, comprising a processor; and a memory storing instructions that when executed configure the processor into:
    a control plane virtual machine, configured to implement a control plane function of the PCRF device, and
    a user plane virtual machine, configured to implement a user plane function of the PCRF device,
    wherein, the user plane virtual machine comprises an Input/Output (I/O) virtual machine configured to implement an I/O function, a search virtual machine configured to implement a search function and a storage virtual machine configured to implement a storage function,
    wherein, the I/O virtual machine receives a policy and charging control (PCC) authorization request information sent from a gateway device, and forwards the received PCC authorization request information to the search virtual machine based on a forwarding rule which is stored in the I/O virtual machine in advance by a control plane virtual machine of the PCRF device;
    wherein the search virtual machine searches, based on the PCC authorization request information, for user subscription index information corresponding to the PCC authorization request information in information stored locally, and if corresponding user subscription information is obtained from a storage virtual machine based on the user subscription index information, sends the user subscription information and the PCC authorization request information to the control plane virtual machine;
    wherein the control plane virtual machine performs bearer binding, based on the PCC authorization request information and the user subscription information, on the PCC authorization request information and a IP-connectivity access network (IP-CAN) corresponding to the PCC authorization request information, and generates bearer mapping information;
    wherein the control plane virtual machine draws a policy for the PCC, based on a bearer binding result, the PCC authorization request information and the user subscription information, generates PCC authorization information, and sends the PCC authorization information to the I/O virtual machine; and
    wherein the I/O virtual machine sends the PCC authorization information to the gateway device.

2. The device of claim 1, wherein, if the search virtual machine fails to search, based on the PCC authorization request information, for the user subscription index information corresponding to the PCC authorization request information in the information stored locally, the search virtual machine sends the PCC authorization request information to the control plane virtual machine, and the control plane virtual machine sends a user subscription information request to a user subscription information database based on the PCC authorization request information, generates PCC authorization information based on user subscription information obtained from the user subscription information database and the PCC authorization request information, sends the PCC authorization information to the I/O virtual machine and sends the user subscription information to the storage virtual machine to store for subsequent use.

3. The device of claim 2, wherein, the PCC authorization request information carries bearer information including quality of service, traffic flow template to identify a source address, a destination address, a source port, a destination port of the communication, and service description information.

4. The device of claim 2, wherein, the I/O virtual machine receiving the PCC authorization request information is determined based on a preset rule that the I/O virtual machine is selected based on an IP address of the source device of the PCC authorization request information.

5. A Policy and Charging Rules Function (PCRF) virtualization method performed on a virtualization PCRF device including a control plane virtual machine configured to implement a control plane function of the PCRF device, and a user plane virtual machine configured to implement a user plane function of the PCRF device, wherein, the user plane virtual machine comprises an Input/Output (I/O) virtual machine configured to implement an I/O function, a search virtual machine configured to implement a search function and a storage virtual machine configured to implement a storage function,
    wherein, the method comprises:
    receiving and forwarding, by the I/O virtual machine, a policy and charging control (PCC) authorization request information sent from a gateway device, to the search virtual machine based on a forwarding rule which is stored in the I/O virtual machine in advance by a control plane virtual machine of the PCRF device;
    searching, by the search virtual machine, based on the PCC authorization request information, for user subscription index information corresponding to the PCC authorization request information in information stored locally, and if corresponding user subscription information is obtained from a storage virtual machine based on the user subscription index information, sending, by the search virtual machine, the user subscription information and the PCC authorization request information to the control plane virtual machine;
    performing bearer binding, by the control plane virtual machine, based on the PCC authorization request information and the user subscription information, on the PCC authorization request information and a IP-connectivity access network (IP-CAN) corresponding to the PCC authorization request information, and generating, by the control plane virtual machine, bearer mapping information;

drawing, by the control plane virtual machine, a policy for the PCC, based on a bearer binding result, the PCC authorization request information and the user subscription information, and generating and sending, by the control plane virtual machine, PCC authorization information to the I/O virtual machine; and sending, by the I/O virtual machine, the PCC authorization information to the gateway device.

6. The method of claim 5, wherein, if the search virtual machine fails to search, based on the PCC authorization request information, for the user subscription index information corresponding to the PCC authorization request information in the information stored locally, the search virtual machine sends the PCC authorization request information to the control plane virtual machine, and the control plane virtual machine sends a user subscription information request to a user subscription information database based on the PCC authorization request information, generates PCC authorization information based on user subscription information obtained from the user subscription information database and the PCC authorization request information, sends the PCC authorization information to the I/O virtual machine and sends the user subscription information to the storage virtual machine to store for subsequent use.

7. The method of claim 6, wherein, the PCC authorization request information carries bearer information including quality of service, traffic flow template to identify a source address, a destination address, a source port, a destination port of the communication, and service description information.

8. The method of claim 6, wherein, the I/O virtual machine receiving the PCC authorization request information is determined based on a preset rule that the I/O virtual machine is selected based on an IP address of the source device of the PCC authorization request information.

* * * * *